Figure 1:
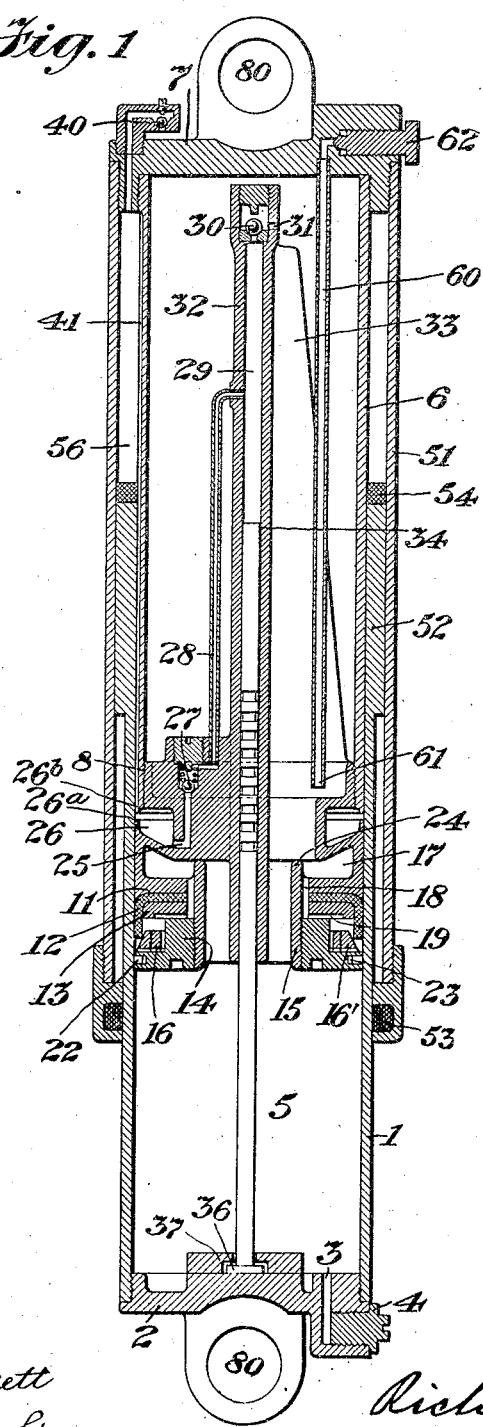

R. LIEBAU.
FLUID PRESSURE DEVICE.
APPLICATION FILED FEB. 25, 1910. RENEWED OCT. 9, 1912.

1,146,335.

Patented July 13, 1915.
2 SHEETS—SHEET 1.

WITNESSES:
Chas. F. Clagett
Thos. McKnight

INVENTOR
Richard Liebau
BY
G. C. Dean ATTORNEY

R. LIEBAU.
FLUID PRESSURE DEVICE.
APPLICATION FILED FEB. 25, 1910. RENEWED OCT. 9, 1912.

1,146,335.

Patented July 13, 1915.
2 SHEETS—SHEET 2.

WITNESSES:
Chas. F. Clagett
Irving M. Wright

INVENTOR
Richard Liebau
BY
G. C. Dean ATTORNEY

UNITED STATES PATENT OFFICE.

RICHARD LIEBAU, OF WATERVLIET, NEW YORK, ASSIGNOR TO THE WESTINGHOUSE
AIR SPRING COMPANY, A CORPORATION OF PENNSYLVANIA.

FLUID-PRESSURE DEVICE.

1,146,335.     Specification of Letters Patent.     Patented July 13, 1915.

Application filed February 25, 1910, Serial No. 545,957. Renewed October 9, 1912. Serial No. 724,855.

*To all whom it may concern:*

Be it known that I, RICHARD LIEBAU, a citizen of the United States, and resident of Watervliet, in the county of Albany and State of New York, have invented certain new and useful Improvements in Fluid-Pressure Devices, of which the following is a specification.

My present invention relates to the class of devices disclosed in the application of George Westinghouse, Serial No. 520,039, filed September 28th, 1909, and Serial No. 545,854 of even date herewith. It is embodied in a fluid compression cylinder particularly adapted for use as a compression spring, which may be used in any relation where two bodies are so associated that resilient movement is desirable, and especially where one or the other of the two bodies is subject to sudden movements, vibrations, or shocks which it is undesirable to have transmitted to the other of said bodies. Certain features relating to the packing and lubrication of the sliding joint of the cylinder are applicable in any relations where high pressures are to be sustained.

It will be understood that though capable of use in other relations, the invention has been devised primarily in connection with automobiles, and the general object in view has been to embody the principles of resilient support by an elastic compression medium, such as air or gas in a practical, self-contained, gas-tight compression device adapted to serve all the purposes of the steel springs commonly used, and to combine therewith all the desirable features of a shock absorber, the entire device being adapted to meet the exacting conditions and to stand the rough usage required in connection with automobiles, delivery wagons, trucks, railway rolling stock, etc.

I prefer to make the compression members in the form of telescoping tubes with the smaller or inner tube uppermost. The tubes are hermetically closed at the outer ends and the inner tube is provided at the inner end with peripheral packing adapted to form a fluid tight joint, and is internally contracted to form a relatively constricted passage, so that the flow of liquid to and fro between the fixed volume compression space in the upper cylinder and the variable space in the lower cylinder, is more or less throttled. The fluid within the cylinder consists of a compressible medium such as air or other gas in the upper portion, and an incompressible medium, such as oil, glycerin, etc., filling the lower portion, preferably to a level above the packing. These of course mingle more or less during active operation of the device by reason of churning and foaming of the liquid.

In said prior applications a pump is employed having an in-take arranged in the rear of the packing and a discharge within the compression device for the purpose of restoring within the device any fluid that may escape therefrom, and in certain cases the pump may have a sufficient capacity to draw a certain amount of air from the outside of the cylinder in which case a relief valve may be arranged to automatically reduce the internal pressure in case it increases above a predetermined desired value. In said prior application the pump is operated by relative movement of the parts of the compression device, the direct source of the power for the pump being derived from the flow of the fluid medium from the variable volume space to the fixed volume space within the same.

My present invention has for its object the provision of a pump for similar purposes but operated by mechanical connection with the relatively movable part so that the action of the pump is more direct and positive than when the power is derived through flow of the fluid medium.

My pump may be employed to produce suction on the low pressure side of the packing of the sliding joint, either with or without an oil collecting groove or the pump may be used to apply the suction between two packings as described in said application Serial No. 545,883 of even date herewith. Some of the advantages resulting from driving the pump through mechanical connection with the relatively movable parts are that the stroke of the piston may be as long as the most extreme movement of the compression device when operated on a load and the power available is very great being measured by the total expansion and compression efforts applied upon the compression device during operation. These advantages appear in greatest degree during periods when the compression device is subject to extreme compression and expansion thereby causing the pump to make a stroke equal to the sum of the distances of the compression and expansion movement on both sides of normal.

I may combine my form of internal pump with an external compression pump such, for instance, as set forth in application of George Westinghouse, Serial No. 545,854 of even date herewith.

Figure 2:
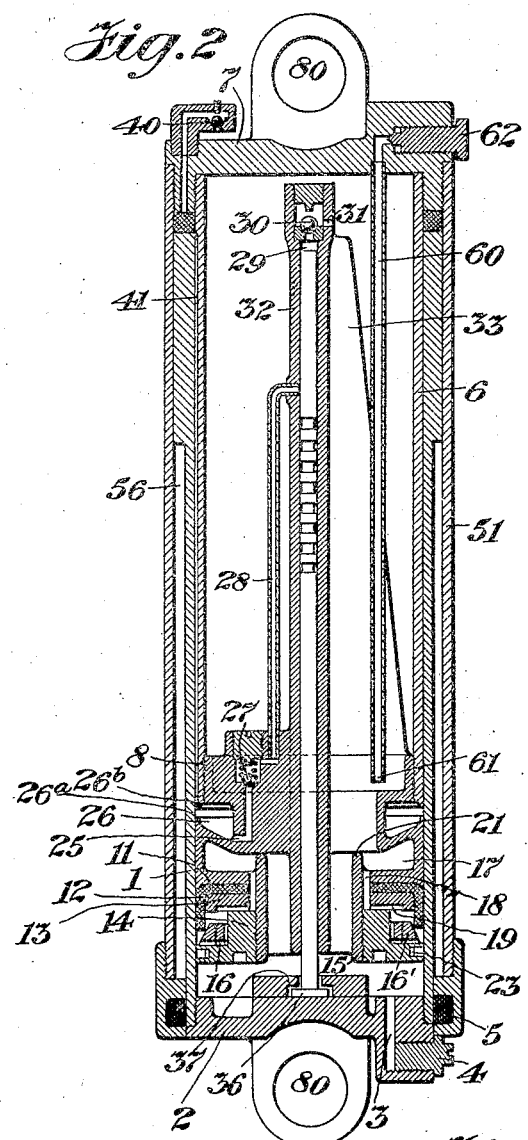
Figure 3:
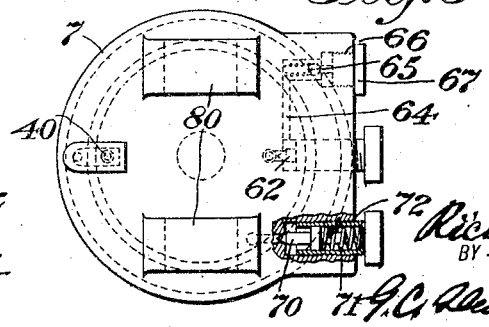

In the drawings Figure 1 is a vertical central section of the device in normal position of rest under load. Fig. 2 is a similar view of the same parts in a position of extreme compression. Fig. 3 is a top plan view of the cylinder.

The lower cylinder 1 is hermetically closed at the bottom by screw plug 2 formed with a discharge passage 3 which is normally closed by a screw plug 4. This cylinder provides the variable space 5, which is adapted to be increased or decreased by up or down movements of the plunger cylinder 6. The latter is provided at the upper end with a hermetic screw closure 7. As shown in the drawings, the lower end is screw threaded at 8 to a plunger head provided with a constricted fluid passage.

The main packing of the plunger comprises a seat 11 for a cup washer 12, which is clamped thereagainst by a ring 13 carried by a screw member 14, screw threaded to the central cylindrical wall 15. The free edge of the cup washer is preferably cut square and is continuously spring pressed against the outer cylinder wall by steel spring expanding rings 16, 16', the latter being coned exteriorly. These rings are of sufficient power to maintain the free edge of the cup washer continuously in perfect contact with the cylinder walls. The annular space adjacent the free edge of the cup washer 12, including the space containing the expanding ring 16, is supplied with oil from the annular reservoir 17, 17, by duct 18, passing through cup leather seat 11 cup leather 12 and clamping ring 13 thence through duct 19. These ducts provide a continuous supply of oil filling all the space adjacent the packing 12 and escape is prevented by means of the supplemental packing 22 arranged below the main packing and held in contact with the walls of the cylinder by expanding the ring 23. Escape of oil from the annular reservoir 17 is prevented by the wall 24, so that an abundant supply of oil will remain in the reservoir, even in case the normal level of the oil is below the normal position of the packing, or in case the packing should be lifted above the oil, as might happen in case a large part of the normal load was removed from the spring.

The means for applying suction to the sliding contact surfaces in the rear of the main packing is arranged in the plunger head. This means consists of a pump having an intake 25 extending into operative relation to the inner wall of cylinder 1. The intake is preferably supplied through an annular recess or chamber 26 formed or provided with thin edges 26ᵃ and 26ᵇ, adapted to clear the outer walls of the cylinder from surplus oil. These clearing edges may be of rigid, resilient or yielding material. The intake is provided with a check valve 27 of any known or desired construction and from this valve the passage 28 leads to the pump cavity 29, whence the oil is discharged through the outlet valve 30 and passage 31 leading to the interior of the cylinder.

According to my invention the pump cavity is formed in an upward extension 32 carried by and preferably formed integral with the plunger head and preferably stiffened or stayed by means of a web 33 which may be cast integrally with the plunger and extension. The proportion of parts must be such that the pump piston will not be withdrawn from the cavity even at the end of the longest possible suction stroke when the device is fully expanded and must not strike forcibly against the end of the pump cavity at the end of the longest possible expelling stroke when the device is fully compressed. Hence, in the form shown the length of the pump cavity is approximately equal to the total possible relative movement of the parts of the compression device from extreme expansion to the extreme compression. The piston 34 is reciprocated by means of power derived directly from relative movement of the parts of the compression device rather than through flow of fluid through the constructed passage between the fixed volume and variable volume compression spaces. A simple connection for this purpose is shown in the drawings, the stem of the piston being provided with an annular shoulder 36 engaging the correspondingly shaped retaining ledge 37 secured to the cylinder head 2. The connection at this point is preferably loose so as to permit the stem of the piston to shift to set itself in exact alinement with the pump cavity especially during extreme compression of the device. If the piston stem were fixed at this point the most extreme accuracy of construction and operation would be necessary in order to prevent lateral strains when the device is compressed to the position shown in Fig. 2.

By reference to Fig. 1, which shows the device in normal position under load, it will be seen that the intake communicates with the pump cavity at a point about half way between the piston head when in normal intermediate position and the outlet at the extreme end of the longest possible expelling stroke. If desired, however, the intake may be arranged at a lower point and may be normally covered by the piston when in the position shown in Fig. 1.

In the normal operation of the device when in use for instance as a spring support on an automobile, the pump cylinder being carried by the plunger head and the pump piston being carried by the lower cylinder the relative movement of the pump piston and cylinder will be greatest and most efficient when the device as a whole is subject to the greatest compression and expansion. For instance, when the automobile passes over a sufficiently high obstruction at sufficient speed the relative movement will carry the pump piston through the extreme range of the expelling stroke and the pump cavity will be emptied by discharge through the valve 30. On the recoil from such extreme compression the relative movement will cause suction, tending to create a vacuum until the intake 28 is uncovered at which instant the vacuum thus produced will be available for applying a powerful instantaneous suction on the intake. If the relative movement in the same direction is continued, the suction will be continued and increased until the extreme end of the suction stroke has been reached.

It will be noted that all lesser movements of the spring will be proportionately less efficient and some of the slower movements may be insufficient to produce any adequate suction on the intake or any adequate compression on the discharge valve. Nevertheless it is found in actual practice that great power and long stroke of the pump render it so efficient that a satisfactory amount of the pumping operation is produced even where the extreme movements occur only at considerable intervals as when proceeding at relatively low speeds on comparatively smooth roads.

I prefer to arrange an exterior or guard cylinder 51 screwed to the closure of the cylinder 6 and engaging the outside of cylinder 1, at the thickened annular edge 52 and at the lower packing 53. The thickened annular edge 52 is preferably provided with a cushion or packing 54 adapted to perform the function of a buffer whenever the compression stroke is sufficiently violent to drive the flange of closure 7 down into contact therewith. The annular space 56 above packing 54 may be utilized as air compression space, in which air compressed by the movements of 52 may be utilized to maintain an initial pressure greater than atmosphere within the annular space 26. The annular space between the thickened annular edge 52 and the lower packing 53 may be utilized as the compression space and special constructions adapted for such operation are described in the application of George Westinghouse Serial Number 545853 and 545,854 of even date herewith and such arrangements are not in my invention except when used in connection with the special form of pump above described, in which case the exterior pump sucks and expels synchronously with my interior pump giving a specific two-stage pumping effect which is different from that disclosed in said Westinghouse application.

In the form shown herein the space 56 is provided with an inlet check valve which is conventionally indicated at 40. With such an arrangement extensive movements of the spring serve to draw air in through the check valve while return movement compresses it and when the movement is sufficient to cause a sufficient rise in pressure the air tends to escape downward through the packing and through the joints between the annular enlargement 52 and the adjacent walls of cylinders 6 and 51. The part that passes between 52 and 6 passes into the annular chamber 26 and raises the pressure thereby tending to force oil or air or both up through the valve 27. It will be noted that this is most likely to happen at a time when the inlet 28 is covered by the piston 34 so that the movement of material from above valve 27 into the pump cavity 29 upon downward movement of the piston is assisted both by the external pressure derived from space 56 and by the internal vacuum due to downward movement of the pump piston 34. If the pressure derived from space 56 is insufficient to open the valve 27 it will nevertheless assist the action of the internal pump by causing air and oil in the sliding joint between 52 and 6, to move toward the annular groove 26 thus keeping the joint clean and also preventing tendency to formation of a vacuum in chamber 26.

Obviously the tendency of the compressed air in 56 to escape between 52 and 6 may be made greater than the tendency to escape between 52 and 51, as for instance, by grooving the outer surface of cylinder 6 as at 41 or by providing special packing between 52 and 51 or by both expedients.

The arrangements for charging the device with oil and compressed air are preferably located in head 7 of cylinder 6. As shown in Fig. 1, an inlet tube 60 extends down a desired distance, so that its outlet orifice 61 is at or about the desired level of the liquid to be used. The passage of air or liquid through this tube is controlled by a needle valve indicated at 62. As indicated in Fig. 3, there is a passage 64 leading from the needle valve chamber to an inlet check valve 65, which communicates with a screw threaded opening 66, to which may be connected supply pipes for oil or compressed air. In charging the device oil may be introduced either by removing needle valve 62 and substituting an oil supply pipe, or needle valve 62 may be merely loosened and the oil supplied through the opening 66 and check valve 65. After oil has been charged into the device to a suitable height, which is preferably above the level of the orifice 61 of pipe 60, the compressed air is introduced through 66, 65, 64, 60, until the internal pressure is sufficient to support the desired load with the parts approximately in the position indicated in Fig. 1. The air supply is then detached and surplus oil blown out through pipe 60, until the escape of air indicates that its orifice has been uncovered by lowering of the level of the liquid. The needle valve 62 and the plug 67 are then screwed tight and the device is in condition for use.

Where the pumping capacity of the pump described above is sufficient to raise the internal pressure of the device, undue raise of pressure may be prevented by an automatic relief valve, which is diagrammatically indicated in Fig. 3 as comprising a plug valve 70, closing spring 71, and screw adjusting means 72 for adjusting the initial pressure of the spring to thereby predetermine the maximum internal pressure, which may be maintained in the device.

The annular collecting groove or chamber 26 is preferably of considerably greater liquid capacity than would be necessary when the device is in continuous use and the pump in more or less continuous operation. With a groove of the size shown, the device may stand for long periods under very heavy loads and considerable oil may leak through the main packing without the possibility of any oil passing above said collecting groove, which forms a break in the capillary path between the close fitting surfaces of the two cylinders, which break can only be bridged by complete filling of the collecting space. It will thus be evident that up to the capacity of the latter space, the device is proof against ultimate loss of oil or internal pressure, because all oil contained in such space will be returned to the interior of the cylinder by the pump as soon as the latter is put in action by the reciprocating movements of the parts, attendant upon normal active use thereof.

The reservoir oil space 17 is out of the direct path of to and fro movement of fluid, and, hence, the main body of the oil may be churned into foam to a considerable depth while a body of relatively undisturbed oil will remain to cover the ducts 18. Moreover, any foam above the level of 24 will constitute a source of replenishment for reservoir 17 by reason of the oil which will settle out of the foam and flow down into said reservoir. The liquid used is preferably pure, free flowing, mineral oil and it may be mixed with pure, perfectly pulverized graphite.

The above described device is provided at both ends with journals 80, 80, adapted to engage pivots of a universal joint comprising pivots arranged at right angles to each other and a coöperating bracket attached to one of the members to be cushioned by said device.

Various features of my invention are adapted for use in other relations where the conditions and functions to be served are similar, as, for instance, in other devices wherein a sliding joint is required to sustain great pressures without leaking; also they may be used as a supplement to or substitute for and may be supplemented or substituted by features set forth in the application of Richard Liebau, Serial No. 468,762, filed December 22nd, 1909.

I claim:

1. The combination with members having a sliding joint therebetween and forming a chambered device capable of movement for compression and extension, of liquid and gaseous fluids within the chamber, and a pump within said chamber having mechanical connection with both of said members for transferring leaked liquid to said chamber.

2. The combination with members having a sliding joint therebetween and forming a chambered device capable of movement for compression and extension, of packing for said sliding joint, liquid and gaseous fluids within the chamber and a pump within said chamber having mechanical connection with both of said members for transferring leaked liquid from the low pressure side of said packing to said chamber.

3. The combination with members having a sliding joint therebetween and forming a chambered device capable of movement for compression and extension, liquid and gaseous fluids within the chamber, and a pump having a piston and a pump cavity one of which is connected with each of said members and the operation of which is dependent upon the compression and extension movements, for pumping liquid into said chamber.

4. The combination with members having a sliding joint therebetween and forming a chambered device capable of movement for compression and extension, a constriction within said chamber between its ends, and a pump within said chamber one element of which is in positive connection with one member, and the discharge of which connects with said chamber.

5. A cushion device comprising relatively movable members forming a chamber and having a sliding joint therebetween to permit variation of the volumetric capacity thereof; liquid and gaseous fluids within said device, and a pump within said device each element of which is mechanically connected to one of said members and having its discharge connected with said chamber whereby liquid which has leaked by said joint is transferred to the interior of the device.

6. A cushion device comprising relatively movable members forming a chamber and having a sliding joint therebetween to permit variation of the volume of the fluid contained therein; liquid and gaseous fluids within said chamber, and a pump located within said chamber positively connected to one of said members and actuated by the other of said members to pump fluid into said chamber.

7. A cushion device comprising relatively movable members forming a chamber and having a sliding joint therebetween to permit variation of the volume of the fluid contained therein, liquid and gaseous fluids within said chamber, and means, a portion of which is mechanically connected to each of said members, for forcibly returning escaped fluid into said chamber.

8. A cushion device comprising a cylinder, a plunger fitted to slide within said cylinder, a main packing for the sliding joint between said plunger and cylinder, and a supplemental packing adjacent said main packing on its high pressure side closing in an oil space between the main and supplemental packings, in combination with a collecting chamber for oil on the low pressure side of the main packing, and means employing members positively connected to said cylinder and plunger for applying suction to said collecting chamber.

9. A cushion device comprising a cylinder, a plunger fitted to slide therein, a packing for the sliding joint between said plunger and cylinder, an oil reservoir adjacent said packing on its high pressure side for retaining oil in contact with said packing, a chamber for collecting the oil passing said packing and a pump mechanically connected to said cylinder and plunger for transferring oil from said collecting chamber into said cylinder.

10. A cushion device comprising relatively movable members forming a closed chamber having a sliding joint, and a pump, the elements of which are positively connected with said members, and having an outlet connection with said chamber.

11. A cushion device comprising relatively movable members forming a closed chamber, having a sliding joint, an oil collecting chamber, an agent for transferring oil from said collecting chamber to said closed chamber, and means for positively connecting the separate elements of said agent to the separate members and for thereby utilizing the relative movement of said members for operating said agent.

12. A cushioning device comprising telescoping members inclosing a chamber, a pump located within said chamber and having one element positively connected to one of said members and the other connected to the other of said members.

13. A cushioning device including telescoping members having a sliding joint and inclosing a chamber adapted to contain an expansible and a non-compressible fluid, a packing for said sliding joint, and means located within the chamber for delivering non-compressible fluid from the chamber to the packing, one of the elements of said means being mechanically connected to one of said members, and the other element of said means to the other member.

14. A cushioning device including relatively movable members for varying the volumetric capacity of a chamber formed within the device, a pump for transferring liquid contained within the device and having one element thereof mechanically connected to one of said members and the other element mechanically connected to the other member.

15. In a cushioning device, relatively movable members for varying the volumetric capacity of a chamber formed within the device, a pump located within the chamber and mechanically connected to said members for transferring liquid contained within the chamber, and a second pump actuated by the relative motion of the members for returning leakage liquid back into the chamber.

16. A cushioning device comprising telescoping members having a sliding joint and including a chamber adapted to contain an expansible and a non-compressible fluid, a packing for said joint, means located within the chamber and positively actuated by the telescoping members for transferring non-compressible fluid from the bottom thereof to said packing, and means actuated by the relative motion of the members for returning liquid leaking past the packing back into the chamber.

17. In a cushioning device, relatively movable members for varying the volumetric capacity of a chamber inclosed by said members, a packing for the sliding joint between said members, means positively actuated by the relative motion between said members for conveying liquid within said chamber, and means for forcing air into said chamber.

18. A cushioning device comprising telescoping members having a sliding joint and inclosing a chamber, a packing for the joint, a pump located within the telescoping members and positively actuated thereby for transferring leakage liquid from the low pressure side of said packing back into the chamber, and leakage liquid collecting means located on the outside of said telescoping members and communicating with the intake of said pump.

19. In a cushioning device, relatively movable members having a sliding joint therebetween for varying the volumetric capacity of a chamber located within the device, a packing for the sliding joint, a leakage collecting passage located outside of the chamber for collecting liquid leaking past the packing, and means located within the chamber, positively actuated by said members, and communicating with said passage for returning the liquid back into the chamber.

20. In a cushioning device, relatively movable members having a sliding joint therebetween for varying the volumetric capacity of a chamber located within the device, a packing for the sliding joint, a leakage collecting space located outside of the chamber for collecting liquid leaking past the packing, and a pump located within the chamber and having its separate elements mechanically connected to the separate members for returning liquid from said space back into said chamber.

21. In a cushioning device relatively movable members having a sliding joint therebetween for varying the volumetric capacity of a chamber located within the device, a packing for the sliding joint, a pump having its separate elements positively connected to said separate members for returning liquid leaking past the packing back into said chamber, and means located outside of said chamber and operating in series with said pump for delivering leakage liquid back into the chamber.

22. In a cushioning device, relatively movable telescopic members having a sliding joint therebetween and inclosing a chamber, a packing for said sliding joint, a leakage collecting space formed within the chamber on the low pressure side of the packing, a pump, having its separate elements positively connected to the separate telescoping members for returning liquid from said passage into the chamber, a guard cylinder surrounding the telescoping members and forming a leakage collecting passage, and means coöperating with said cylinder for forcing the leakage liquid back into said first-mentioned collecting space.

23. In a cushioning device, relatively movable members for varying the volumetric capacity of a chamber located within the device and having a sliding joint therebetween, and means positively connected to said members and actuated by the relative motion of said members for forcing air into said chamber.

24. An elastic compression device, comprising relatively movable members for varying the volume of the elastic fluid contained in said device, in combination with a pump having a cylinder mechanically connected with one of said movable members and a piston mechanically connected with the other of said members and arranged to decrease the pressure on the low pressure side of the sliding joint between said members.

25. An elastic compression device, comprising relatively movable members for varying the volume of the elastic fluid contained in said device, in combination with an internal pump having a cylinder mechanically connected with one of said movable members and a piston mechanically connected with the other of said members and arranged to increase the pressure within the pressure cavity of said device.

Signed at New York in the county of New York and State of New York this 14th day of February A. D. 1910.

RICHARD LIEBAU.

Witnesses:
GEORGE C. DEAN,
IRVING M. OBRIEGHT.